(12) United States Patent
Hattori et al.

(10) Patent No.: US 9,929,618 B2
(45) Date of Patent: Mar. 27, 2018

(54) INVERTER-INTEGRATED ELECTRIC COMPRESSOR

(71) Applicant: MITSUBISHI HEAVY INDUSTRIES AUTOMOTIVE THERMAL SYSTEMS CO., LTD., Kiyosu-shi, Aichi (JP)

(72) Inventors: Makoto Hattori, Kiyosu (JP); Masahiko Asai, Kiyosu (JP); Hiroyuki Kamitani, Kiyosu (JP); Koji Nakano, Tokyo (JP)

(73) Assignee: MITSUBISHI HEAVY INDUSTRIES AUTOMOTIVE THERMAL SYSTEMS CO., LTD., Kiyosu-Shi (JP)

( * ) Notice: Subject to any disclaimer, the term of this patent is extended or adjusted under 35 U.S.C. 154(b) by 312 days.

(21) Appl. No.: 14/771,726

(22) PCT Filed: Feb. 18, 2014

(86) PCT No.: PCT/JP2014/053818
§ 371 (c)(1),
(2) Date: Aug. 31, 2015

(87) PCT Pub. No.: WO2014/136571
PCT Pub. Date: Sep. 12, 2014

(65) Prior Publication Data
US 2016/0020664 A1    Jan. 21, 2016

(30) Foreign Application Priority Data
Mar. 7, 2013    (JP) ................................ 2013-045359

(51) Int. Cl.
*H02K 5/00*    (2006.01)
*H02K 5/22*    (2006.01)
(Continued)

(52) U.S. Cl.
CPC ............... *H02K 5/22* (2013.01); *F04B 39/00* (2013.01); *F04B 53/16* (2013.01); *H02K 11/0073* (2013.01); *H02K 11/024* (2013.01)

(58) Field of Classification Search
CPC ....................................................... H02K 5/22
(Continued)

(56) References Cited

U.S. PATENT DOCUMENTS 7,021,418 B2 *    4/2006  Tominaga ............ B62D 5/0406
                                                              180/444
2003/0200761 A1   10/2003  Funahashi et al.
(Continued)

FOREIGN PATENT DOCUMENTS

CN    101187364 A    5/2008
CN    101191476 A    6/2008
(Continued)

OTHER PUBLICATIONS

Chinese Office Action dated Sep. 2, 2016, in related Chinese Patent Application No. CN201480012107.6.
(Continued)

*Primary Examiner* — Hanh Nguyen
(74) *Attorney, Agent, or Firm* — Birch, Stewart, Kolasch & Birch, LLP

(57) ABSTRACT

An inverter-integrated electric compressor for which an inverter device is integrally incorporated, with a main circuit board being housed while the four corners thereof are supported by boss parts at locations above high-voltage electrical components and semiconductor switching elements. The multiple high-voltage electrical components are arranged in parallel along one side of the main circuit board at one side of an inverter housing part, with one side of the main circuit board being supported from below by the upper surface of these components. The multiple semiconductor
(Continued)

switching elements are arranged in parallel along the other side opposing the one side of the main circuit board, at the other side of the inverter housing part, with the other side of the main circuit board being supported from below by multiple lead terminals extending upwards.

6 Claims, 5 Drawing Sheets

(51) Int. Cl.
    *F04B 53/16*     (2006.01)
    *H02K 11/00*     (2016.01)
    *H02K 11/02*     (2016.01)
    *F04B 39/00*     (2006.01)

(58) Field of Classification Search
    USPC .................................................. 310/88, 89
    See application file for complete search history.

(56) References Cited

U.S. PATENT DOCUMENTS

| | | | |
|---|---|---|---|
| 2008/0141693 A1 | 6/2008 | Enami et al. | |
| 2009/0096301 A1* | 4/2009 | Sumi | H02K 11/33 310/89 |
| 2009/0246047 A1 | 10/2009 | Hattori et al. | |
| 2010/0181876 A1 | 7/2010 | Watanabe et al. | |

FOREIGN PATENT DOCUMENTS

| | | |
|---|---|---|
| EP | 2 189 661 A1 | 6/2008 |
| JP | 6-10634 B2 | 2/1994 |
| JP | 2003-324903 A | 11/2003 |
| JP | 2006-177214 A | 7/2006 |
| JP | 2007-198341 A | 8/2007 |
| JP | 2007-295639 A | 11/2007 |
| JP | 2008-133729 A | 6/2008 |
| JP | 4119727 B2 | 7/2008 |
| JP | 2008-215089 A | 9/2008 |
| JP | 2009-247066 A | 10/2009 |
| JP | 2010-1859 A | 1/2010 |
| JP | 4853077 B2 | 1/2012 |
| JP | 2012-193660 A | 10/2012 |
| JP | 2014-131445 A | 7/2014 |

OTHER PUBLICATIONS

Decision to Grant a Patent in Japanese Patent Application No. JP2013-045359, dated Nov. 22, 2016.

* cited by examiner

INVERTER-INTEGRATED ELECTRIC COMPRESSOR

TECHNICAL FIELD

The present invention relates to an inverter-integrated electric compressor in which an inverter device is integrally incorporated in the housing of an electric compressor.

BACKGROUND ART

Inverter-integrated electric compressors, which integrally incorporate inverter devices, are used as air conditioner compressors installed in electric vehicles, hybrid vehicles, and the like. This inverter-integrated electric compressor is configured so that high-voltage direct current (DC) power supplied from a power supply unit installed in a vehicle is converted to three-phase alternating current (AC) power of a required frequency by the inverter device, which is then applied to an electric motor so that the electric motor is driven.

The inverter device is configured by a plurality of high-voltage electrical components such as a coil and a capacitor configuring a filter circuit for noise removal, a plurality of semiconductor switching elements such as IGBTs configuring a switching circuit for converting electric power, a circuit board on which an inverter circuit including the filter circuit and the switching circuit, or a control circuit thereof, is mounted, and the like. The inverter device is integrated by being incorporated in an inverter housing part provided on the outer periphery of the housing of the electric compressor.

Patent Document 1 discloses an inverter device in which a control circuit board on which a capacitor or a microcomputer is mounted and an inverter circuit board on which an IGBT is mounted, or a circuit board which integrates these two circuit boards, are installed on multiple cylindrical legs in a circuit chamber provided in a housing. The inverter device is configured to dissipate heat generated by the capacitor or the microcomputer via these legs. In addition, Patent Document 2 discloses an inverter device with a configuration in which a power conversion circuit board on which switching elements, a capacitor, a coil, and the like are mounted is installed on a circuit board cover side. The circuit board cover is attached to the inverter installation surface on the housing side. A fluid member formed of a gel-like material is arranged between the switching elements, the capacitor, and the coil, and a surface opposing the installation surface side and a concave section to adjust gaps and secure heat dissipation.

Furthermore, Patent Document 3 discloses an inverter device in which, a circuit board on which switching elements, a filter coil, a capacitor, and the like are mounted, is arranged in an inner section of an inverter housing space on a circuit board supporting member such that the filter coil and the capacitor do not come into contact with the bottom wall of the housing space. A power supply connector which has metal terminals is integrally formed by resin insert molding on the side of an inverter cover which seals the housing space and the metal terminals of the power connector are connected with the circuit board side by attaching and installing the inverter cover.

CITATION LIST

Patent Literature

Patent Document 1: Japanese Unexamined Patent Application Publication No. 2007-198341A Patent Document 2: Japanese Unexamined Patent Application Publication No. 2007-295639A Patent Document 3: Japanese Unexamined Patent Application Publication No. 2012-193660A

SUMMARY OF INVENTION

Technical Problem

Four corners of an inverter circuit board or a circuit board configuring an inverter device are fixedly installed on support legs provided in an inverter housing part. However, since it is necessary to secure vibration resistance with respect to the running vibration of the vehicle or the like, locations where large components are mounted other than the four corners may also be supported by support legs, or a gel material may be filled in the inverter housing part to counter the vibration. Patent Document 1 discloses supporting a central location as well as the periphery of the circuit board with cylindrical legs, and Patent Document 2 discloses installing a power conversion circuit board on the cover side and arranging a fluid member formed of a gel-like material between the power conversion circuit board and the installation surface on the housing side.

The installation of a central support leg or the filling of a gel material are essentially unnecessary if the vibration resistance of the circuit board can be secured. However, as described in Patent Documents 1 to 3, since a circuit power integrated with a filter circuit or a switching circuit on which semiconductor switching elements, a filter coil, a capacitor, or the like are mounted is increased in size, it is necessary to increase the number of central support legs or the amount of the filled gel material in order to secure the vibration resistance, which are factors leading increases in the size or weight of the inverter device, or increases in cost.

The present invention is created in consideration of these circumstances and an object of the present invention is to provide an inverter-integrated electric compressor which secures vibration resistance of a circuit board using existing inverter components, and which simplifies the configuration, reduces the size and weight, and lowers costs by making the installation of a gel material or central support legs unnecessary.

Solution to Problem

The inverter-integrated electric compressor of the present invention employs the following means to solve the above problems.

An inverter-integrated electric compressor according to a first aspect of the present invention is an inverter-integrated electric compressor for which an inverter device is integrally incorporated in an inverter housing part provided in a housing periphery. The integrally incorporated inverter device is formed of a plurality of high-voltage electrical components configuring a filter circuit, a plurality of semiconductor switching elements configuring a switching circuit, and a rectangular main circuit board on which an inverter circuit including the filter circuit and the switching circuit is mounted. The main circuit board is housed while four corners thereof are supported by boss parts in locations above the high-voltage electrical components and the semiconductor switching elements. The plurality of high-voltage electrical components is arranged in parallel along one side of the main circuit board at one side of the inverter housing part, the upper surface thereof supporting one side of the main circuit board from below. The plurality of semiconductor switching elements is arranged in parallel along another side opposing the one side of the main circuit board at another side of the inverter housing part, with the other side of the main circuit board being supported from below by multiple lead terminals extending upward.

According to the first aspect of the present invention, in the inverter-integrated electric compressor for which an inverter device is integrally incorporated in an inverter housing part in a housing, the integrally incorporated inverter device being formed of a plurality of high-voltage electrical components, a plurality of semiconductor switching elements, and a rectangular main circuit board on which an inverter circuit is mounted, the rectangular main circuit board is housed while four corners thereof are supported by boss parts in locations above the high-voltage electrical components and the semiconductor switching elements. The plurality of high-voltage electrical components is arranged in parallel along one side of the main circuit board at one side of the inverter housing part, the upper surface thereof supporting one side of the main circuit board from below. Also, the plurality of semiconductor switching elements is arranged in parallel along another side opposing the one side of the main circuit board at another side of the inverter housing part, with another side of the main circuit board being supported from below by multiple lead terminals extending upward. For this reason, it is possible to install the main circuit board, which is housed in the inverter housing part while four corners thereof are supported by boss parts, while supporting two opposing sides other than the four corners thereof from below using the plurality of high-voltage electrical components and the plurality of semiconductor switching elements. Also, it is possible to firmly support the main circuit board by setting support points according to the high-voltage electrical components and the semiconductor switching elements as fixing points and support points of the main circuit board. Accordingly, it is not necessary to secure the vibration resistance of the main circuit board by filling in a gel material or erecting supporting columns. By making these unnecessary and securing the vibration resistance of the main circuit board using existing inverter components, it is possible to simplify the configuration, reduce the size and weight, lower costs, and improve reliability.

Furthermore, in the inverter-integrated electric compressor according to a second aspect of the present invention, the plurality of high-voltage electrical components in the inverter-integrated electric compressor described above is installed on a bottom surface of one side along an axial direction of an outer peripheral wall of a cylindrical housing forming the bottom surface of the inverter housing part and the filter circuit is configured by mounting the plurality of high-voltage electrical components on the main circuit board.

According to the second aspect of the present invention, the plurality of high-voltage electrical components is installed on a bottom surface of one side along an axial direction of an outer peripheral wall of a cylindrical housing forming the bottom surface of the inverter housing part and the filter circuit is configured by mounting the plurality of high-voltage electrical components on the main circuit board. For this reason, by installing comparatively large high-voltage electrical components such as a coil, a capacitor, and the like which configure a filter circuit on the bottom surface of one side along an axial direction of an outer peripheral wall of a cylindrical housing forming the bottom surface of the inverter housing part, the height dimensions of the inverter housing part are suppressed to be low. By configuring the filter circuit by mounting these high-voltage electrical components on the main circuit board, it is possible to configure the filter circuit in a simple manner by omitting busbars, and the like. Accordingly, it is possible to reduce the size and weight of the inverter-integrated electric compressor, and to lower costs by reducing the size of the inverter housing part and simplifying and reducing the size of the inverter device by eliminating components.

Furthermore, in an inverter-integrated electric compressor according to a third aspect of the present invention, the plurality of semiconductor switching elements in any one of the inverter-integrated electric compressors described above is fixedly installed on a heat-radiating block erected on the bottom surface of another side along the axial direction of the outer peripheral wall of the cylindrical housing forming the bottom surface of the inverter housing part, and the switching circuit is configured by mounting the plurality of semiconductor switching elements on the main circuit board.

According to the third aspect of the present invention, the plurality of semiconductor switching elements is fixedly installed on a heat-radiating block erected on the bottom surface of another side along the axial direction of the outer peripheral wall of the cylindrical housing forming the bottom surface of the inverter housing part, and the switching circuit is configured by mounting the plurality of semiconductor switching elements on the main circuit board. For this reason, by the plurality of semiconductor switching elements such as IGBTs or the like which configure a switching circuit being fixedly installed on a heat-radiating block erected on the bottom surface of one side along the axial direction of the outer peripheral wall of the cylindrical housing forming the bottom surface of the inverter housing part, the heat dissipation performance is secured while the installation space for the semiconductor switching elements is narrowed. Moreover, it is possible to secure the strength for supporting the main circuit board by configuring the switching circuit by shortening the lead terminals as much as possible and mounting the terminals on the main circuit board. Accordingly, by reducing the size of the inverter housing part and simplifying and reducing the size of the inverter device, it is possible to reduce the size and weight of the inverter-integrated electric compressor and to lower costs.

Furthermore, in an inverter-integrated electric compressor according to a fourth aspect of the present invention, the heat-radiating block in the inverter-integrated electric compressor described above is a block formed of a heat conductive material erected in the vertical direction on the bottom surface of the inverter housing part, and the plurality of semiconductor switching elements is fixedly installed on both vertical side surfaces thereof with the lead terminals facing vertically upward.

According to the fourth aspect of the present invention, the heat-radiating block is a block formed of a heat conductive material erected in the vertical direction on the bottom surface of the inverter housing part, and the plurality of semiconductor switching elements is fixedly installed on both vertical side surfaces thereof with the lead terminals facing vertically upward. For this reason, by three-dimensionally installing the plurality of semiconductor switching elements such as the IGBTs with the lead terminals facing vertically upward on both vertical side surfaces of the heat-radiating block, it is possible to narrow the installation space thereof, and it is possible to dissipate the heat generated by these elements to the housing side through the block made of heat conductive material and to favorably maintain the cooling performance. Moreover, it is not necessary to bend the lead terminals, the rigidity is secured by minimizing the lengths thereof, and it is possible to support the main circuit board. Accordingly, by reducing the size of the inverter housing part and simplifying and reducing the size of the inverter device, it is possible to reduce the size and weight of the inverter-integrated electric compressor and to lower costs.

Furthermore, in an inverter-integrated electric compressor according to a fifth aspect of the present invention, the plurality of high-voltage electrical components and the plurality of semiconductor switching elements in any one of the inverter-integrated electric compressors described above configure the filter circuit and the switching circuit on the main circuit board by each lead terminal being passed through through-holes in the main circuit board and being soldered and mounted in a pattern on the main circuit board.

According to the fifth aspect of the present invention, the plurality of high-voltage electrical components and the plurality of semiconductor switching elements configure the filter circuit and the switching circuit on the main circuit board by each lead terminal being passed through through-holes in the main circuit board and being soldered and mounted in a pattern on the main circuit board. Thus, by the lead terminals being passed through the through-holes in the main circuit board and soldered, and the plurality of high-voltage electrical components and the plurality of semiconductor switching elements being mounted on the main circuit board, it is possible to firmly support the main circuit board with these plurality of high-voltage electrical components and plurality of semiconductor switching elements at the same time as configuring the filter circuit and the switching circuit on the main circuit board with this pattern. Accordingly, it is possible to sufficiently improve the vibration resistance of the main circuit board while simplifying the configuration of the inverter device.

Furthermore, in an inverter-integrated electric compressor according to a sixth aspect of the present invention, the main circuit board in any one of the inverter-integrated electric compressors described above is supported not only by the boss parts, the plurality of high-voltage electrical components, and the plurality of semiconductor switching elements, but also by an inter-circuit board connection terminal installed near a center of the inverter housing part, which is a location below the main circuit board, to connect electrically with a sub-circuit board on which a low-voltage communication circuit connected with a communication line is mounted, and/or by a UVW busbar connected with a glass-sealed terminal installed to pass through the housing at a location in front of the inverter housing part.

According to the present invention, the main circuit board is supported not only by the boss parts, the plurality of high-voltage electrical components, and the plurality of semiconductor switching elements, but also by an inter-circuit board connection terminal installed near a center of the inverter housing part, which is a location below the main circuit board, to connect electrically and mechanically with a sub-circuit board on which a low-voltage communication circuit connected with a communication line is mounted, and/or supported by a UVW busbar connected with a glass-sealed terminal installed to pass through the housing at a location in front of the inverter housing part. For this reason, it is possible to support the main circuit board not only by the boss parts, the plurality of high-voltage electrical components, and the plurality of semiconductor switching elements, but also by an inter-circuit board connection terminal which is a constituent component of the inverter device, and/or by a UVW busbar or the like connected with a glass-sealed terminal. Accordingly, it is possible to more firmly support the main circuit board using the constituent components of the inverter device without providing a new supporting member. Also, it is possible to improve the vibration resistance, simplify the configuration, reduce the size and weight, and lower costs, without providing a gel material or a support column.

Advantageous Effects of Invention

According to the present invention, it is possible to install the main circuit board, which is housed in the inverter housing part while the four corners thereof are supported by boss parts, while supporting two opposing sides other than the four corners thereof from below using the plurality of high-voltage electrical components and the plurality of semiconductor switching elements. Also, it is possible to firmly support the main circuit board by setting the support points according to the high-voltage electrical components and the semiconductor switching elements as the fixing points and support points of the main circuit board. For this reason, it is not necessary to secure the vibration resistance of the main circuit board by filling in a gel material or erecting supporting columns. By making these unnecessary and securing the vibration resistance of the main circuit board using existing inverter components, it is possible to simplify the configuration, reduce the size and weight, lower costs, and improve reliability.

DESCRIPTION OF EMBODIMENTS

An embodiment of the present invention will be described below with reference to FIGS. 1 to 5.

Figure 1:
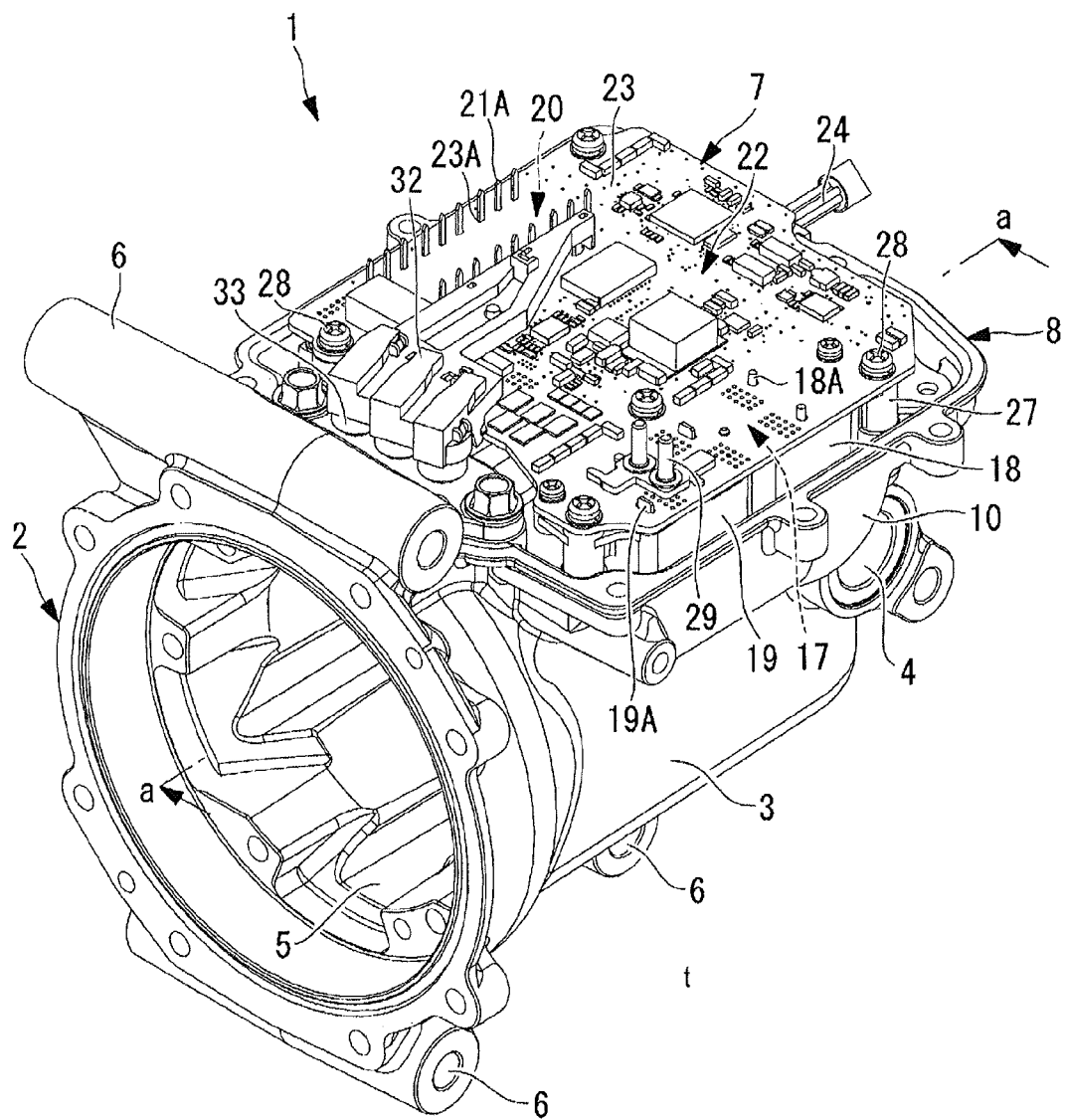
FIG. 1 is a perspective view illustrating a configuration of main components of an inverter-integrated electric compressor according to an embodiment of the present invention.
Figure 2:
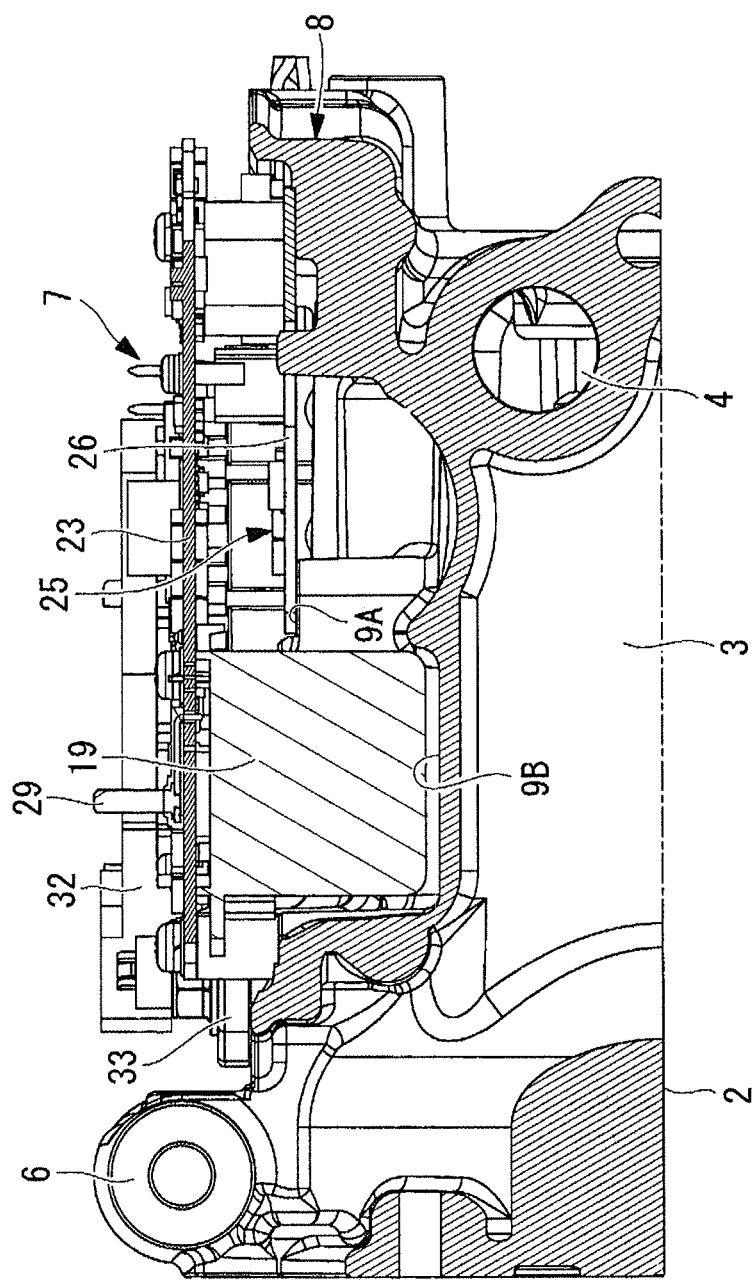
FIG. 2 is a corresponding longitudinal cross-sectional view along line a-a in FIG. 1.
Figure 3:
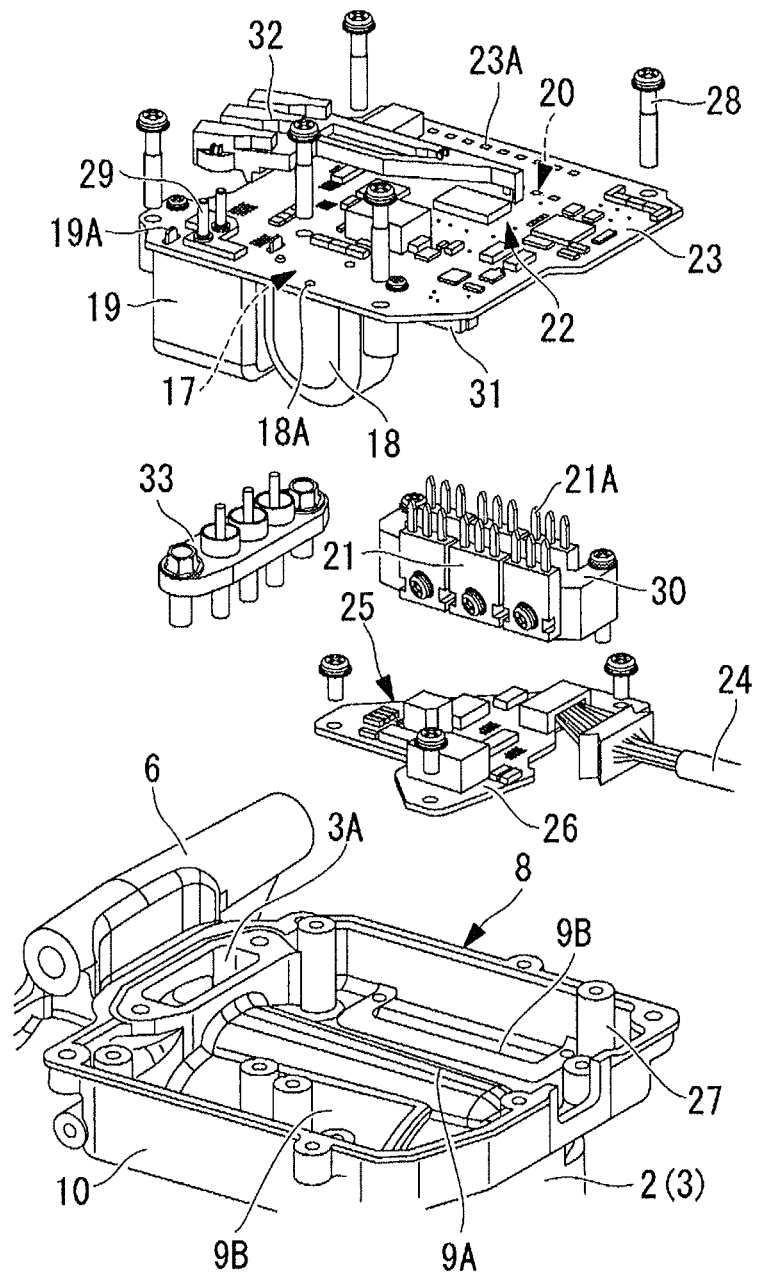
FIG. 3 is an exploded perspective view of an inverter device housed in an inverter housing part of the inverter-integrated electric compressor.
Figure 4:
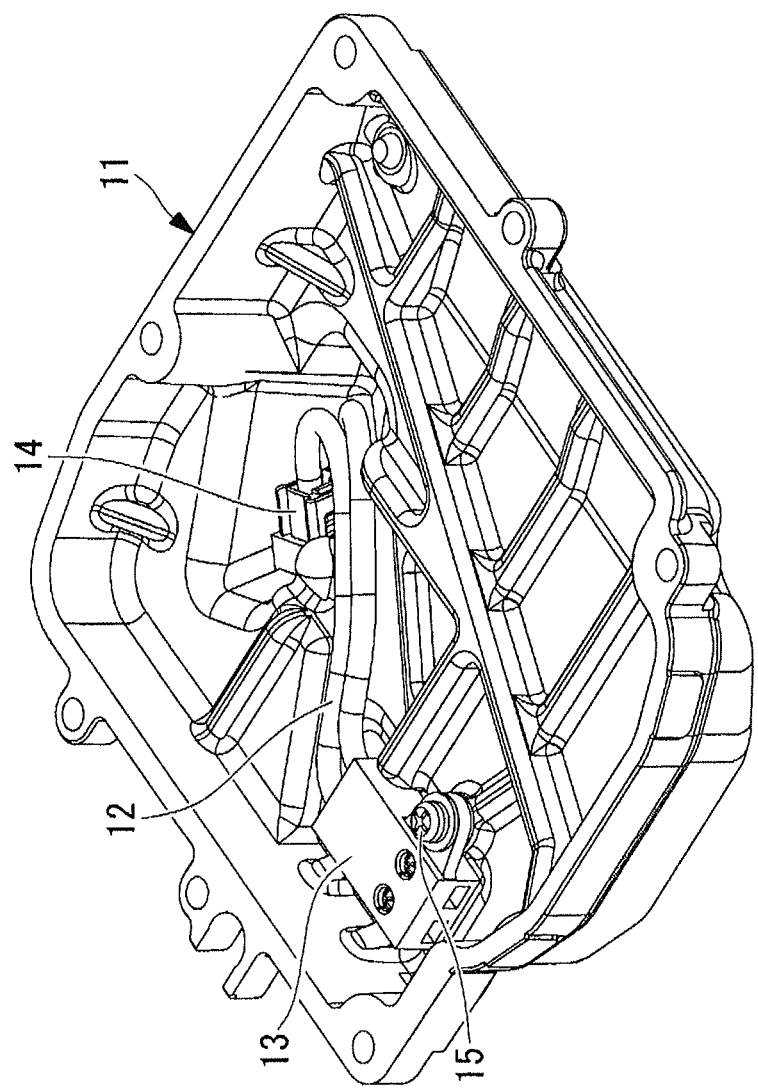
FIG. 4 is a perspective view of a rear side of a cover which seals an inverter housing part of the inverter-integrated electric compressor.
Figure 5:
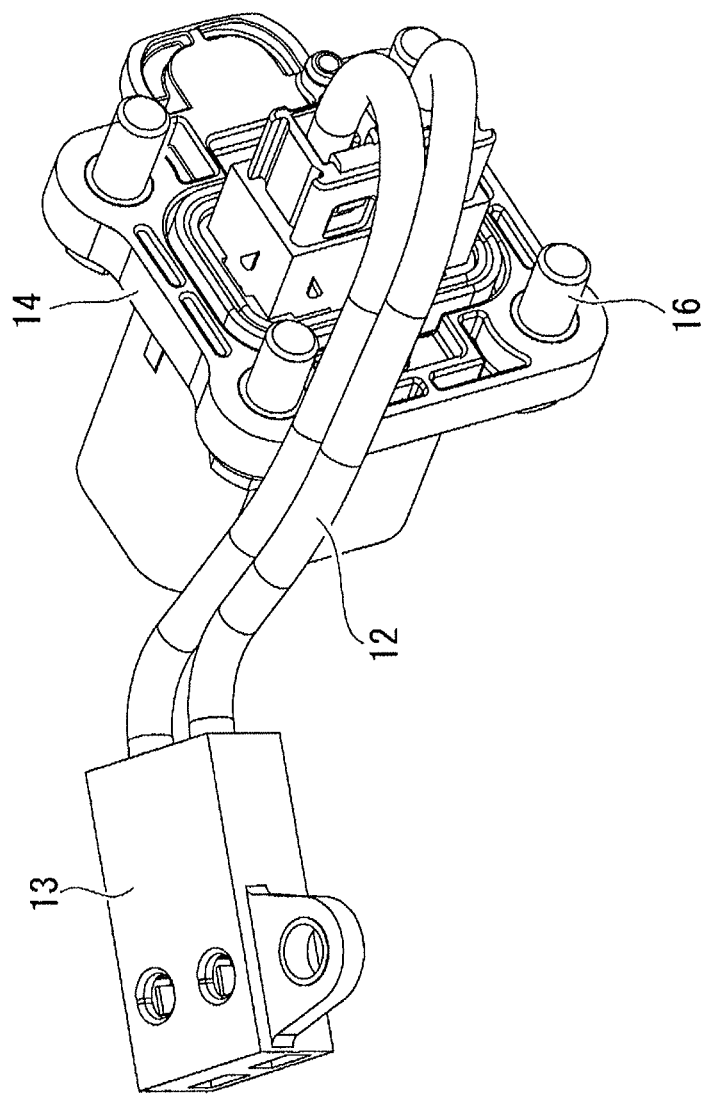
FIG. 5 is a perspective view of a single power source cable connected with the cover.

FIG. 1 is a perspective view of main components of an inverter-integrated electric compressor according to an embodiment of the present invention. FIG. 2 is a corresponding longitudinal cross-sectional view along the line a-a in FIG. 1. FIG. 3 is an exploded perspective view of an inverter device housed in an inverter housing part. FIG. 4 is a perspective view of a rear side of a cover which seals an inverter housing part. FIG. 5 is a perspective view of a single power source cable.

An inverter-integrated electric compressor 1 is provided with a cylindrical housing 2 configuring an outer shell. The housing 2 is configured by integrally combining an aluminum die-cast motor housing 3 with a built-in electric motor (not illustrated) and an aluminum die-cast compressor housing (not illustrated) with a built-in compression mechanism (not illustrated).

The inverter-integrated electric compressor 1 is configured so that the electric motor and compression mechanism built into the housing 2 are linked through a rotary shaft, and the compression mechanism is driven by the electric motor being rotationally driven via an inverter device 7 described below, whereby a low-pressure refrigerant gas drawn into the interior of the motor housing 3 via an intake port 4 provided in the side surface at the rear end side of the motor housing 3 is drawn in via the periphery of the electric motor, compressed to a high pressure by the compression mechanism, and discharged inside the compressor housing, and then sent outside.

The motor housing 3 has a plurality of refrigerant flow paths 5 formed therein to allow refrigerant to flow in the axial direction along the inner circumferential surface thereof, and a plurality of legs 6 for mounting the electric compressor 1 provided on the outer circumference thereof. An inverter housing part 8 for integrally incorporating the inverter device 7 is also integrally formed on the outer circumference of the housing 2 (on the motor housing 3 side). The inverter housing part 8 has a substantially square shape in plan view, configured with a central section of the bottom surface as a partially flat base surface 9A formed by a wall surface of the motor housing 3, both side surface sections as a concave section 9B along the housing outer peripheral surface, and a flange 10 being extended upward at the periphery.

The inverter housing part 8 is configured to be sealed by attaching a cover 11 illustrated in FIG. 4 to the flange 10 after incorporating the inverter device 7. A high-voltage cable (power source cable) 12 is provided on the inner surface side of the cover 11. As illustrated in FIG. 5, a high-voltage cable 12 is provided with a connector 13 at one end side and provided with connector terminals 14 connected with the cable on the power source side at the other end side. The connector 13 at one end is fixedly installed using a screw 15 at the inner surface of the cover 11 at a position corresponding to a P-N terminal 29 provided on a main circuit board 23 to be described below. A connector terminal 14 at the other end is fixedly installed using a plurality of screws 16 from the outer surface side in a state where a terminal portion protrudes from the outer surface side of the cover 11.

The high-voltage cable 12 is a part of the power source cable and is connected with a power supply unit installed in a vehicle via a power source cable. The high-voltage cable 12 is for inputting high-voltage DC power supplied from the power supply unit to the inverter device 7 by the connector 13 provided at one end thereof being connected with the P-N terminal 29 provided on the main circuit board 23 of the inverter device 7.

As is known, the inverter device 7 converts high-voltage DC power supplied from the power supply unit installed in the vehicle to three-phase AC power of a required frequency based on a command from a host controller, and applies the AC power to an electric motor to rotate and drive the electric motor. As illustrated in FIG. 1 to FIG. 3, the inverter device 7 is integrally incorporated with the inverter housing part 8 provided on the outer periphery of the housing 2.

The inverter device 7 is configured by the plurality of high-voltage electrical components (hereinafter, referred to simply as electrical components) such as a coil 18 and a capacitor 19 in the case configuring a known filter circuit 17 for removing noise, the plurality (six) of semiconductor switching elements 21 formed of heat generating power transistors such as IGBTs configuring a known switching circuit 20 for converting DC power to three-phase AC power, the rectangular main circuit board 23 on which a control circuit 22 including an inverter circuit including a filter circuit 17 and the switching circuit 20, a microcomputer controlling the above, and the like are mounted, and a sub-circuit board 26 provided with a communication circuit 25 connected with a communication line 24 from the host controller.

The inverter device 7 may be known; however, here, as the main circuit board 23, a circuit board is used on which the electrical components such as the coil 18 and the capacitor 19 configuring the filter circuit 17 are mounted by soldering lead terminals 18A and 19A, and the plurality (six) of semiconductor switching elements 21 formed of heat generating power transistors such as IGBTs configuring the switching circuit 20 is mounted by soldering lead terminals 21A thereof (each IGBT has three lead terminals 21A to make a total of 18).

In other words, in the main circuit board 23, the filter circuit 17 and the switching circuit 20 are configured on the main circuit board 23 by the lead terminals 18A and 19A of the coil 18 and the capacitor 19 configuring the filter circuit 17 and the lead terminals 21A of the plurality of semiconductor switching elements 21 configuring the switching circuit 20 passing through respective through-holes in the main circuit board 23, and these lead terminals being soldered and mounted on the circuit board in a pattern. The main circuit board 23 is fastened to boss parts 27 provided at four corners in the inverter housing part 8 using screws 28.

The capacitor 19 which is one of the high-voltage electrical components configuring the filter circuit 17 is configured to be housed in a case and the outer shape is set to a square shape (a rectangular shape) and the upper surface is set to a flat planar shape as illustrated in FIG. 2 and FIG. 3. In the same manner, the coil 18 wound into a cylindrical shape is configured to be housed in a case with a semi-cylindrical shape for which the upper surface is a flat planar shape. Then, the coil 18 and the capacitor 19 are mounted to be arranged in parallel along one side of the main circuit board 23 set to a rectangular shape.

Furthermore, the coil 18 and the capacitor 19 mounted on the main circuit board 23 are configured to be fixedly installed using an adhesive on the bottom surface set to be the concave surface 9B of one side along the axial direction of the outer peripheral wall of the cylindrical housing 2 forming the bottom surface in the inverter housing part 8 such that the lower surface of the main circuit board 23 is supported by the respective flat upper surfaces thereof, and it is possible to support stress and vibration applied to the main circuit board 23. In addition, in this manner, the P-N terminal 29 for inputting DC power from a power source to the inverter device 7 is erected to face upward on the upper surface at the location supported by the capacitor 19 in the main circuit board 23 of which the bottom surface is supported by the coil 18 and the capacitor 19. The connector 13 of the high-voltage cable 12 is connected with the P-N terminal 29.

In addition, as illustrated in FIG. 3, the plurality (six) of semiconductor switching elements 21 is fixedly installed on a heat-radiating block 30 erected on the concave surface 9B on the other side along the axial direction of the outer peripheral wall of the cylindrical housing 2 forming the bottom surface in the inverter housing part 8. The heat-radiating block 30 is a rectangular block with a predetermined length made of an aluminum alloy which is a heat conductive material. The heat-radiating block 30 is three-dimensionally installed with the semiconductor switching elements 21 being screwed and fixed in sets of three on the vertical side surfaces of both the left and right sides thereof with three lead terminals 21A facing vertically upward from each semiconductor switching element 21. The heat-radiating block 30 dissipates heat generated by the semiconductor switching elements 21 to the housing 2 side and has a function of cooling the semiconductor switching elements 21.

As illustrated in FIG. 1, a total of 16 of the lead terminals 21A of the plurality of semiconductor switching elements 21 installed as described above are configured to protrude upward passing through through-holes 23A provided along the other side opposing the one side of the main circuit board 23 which is supported by the coil 18 and capacitor 19. The lead terminals 21A are mounted on the main circuit board 23 by being soldered at this section. Due to this, the configuration is able to support the other side opposing the one side of the main circuit board 23 from below with multiple lead terminals 21A of the plurality of semiconductor switching elements 21. Here, the heat-radiating block 30 is screwed and fixed on the concave surface 9B in the inverter housing part 8; however, the heat-radiating block 30 may be configured to be integrally formed on the motor housing 3 side.

Furthermore, at the rear of the central section of the bottom surface of the inverter housing part 8, the sub-circuit board 26 on which the communication circuit 25 connected with a communication line 24 is mounted is fixedly installed using screws or the like on boss parts not illustrated in the diagram so as not to contact the flat base surface 9A. The sub-circuit board 26 is provided between the coil 18 and the capacitor 19 and the plurality of semiconductor switching elements 21, which are arranged on both the left and right sides of the inverter housing part 8. The sub-circuit board 26 is configured to be provided with the main circuit board 23 arranged thereabove. The sub-circuit board 26 is electrically and mechanically connected with main circuit board 23 arranged above via an inter-circuit board connection terminal 31 (refer to FIG. 3). Accordingly, even the inter-circuit board connection terminal 31 is configured to be able to support the main circuit board 23 from below.

In addition, the power converted from DC power to three-phase AC power by passing through the switching circuit 20 of the inverter device 7 is output to a glass-sealed terminal 33 via a UVW busbar 32 from the main circuit board 23 side. The glass-sealed terminal 33 is installed in a terminal installation hole 3A (refer to FIG. 3) provided so as to pass through the motor housing 3 in a location in front in the inverter housing part 8. The glass-sealed terminal 33 applies the three-phase AC power from the UVW busbar 32 to the electric motor in the motor housing 3. The UVW busbar 32 installed on the main circuit board 23 is configured to be linked with the glass-sealed terminal 33, and one side of the main circuit board 23 is fixed and supported due to this.

As described above, in the present embodiment, not only is the main circuit board 23 which is installed in the inverter housing part 8 fixed by fastening the four corners thereof to the boss parts 27 using screws 28, but one side of the main circuit board 23 is supported from below using the coil 18 and the capacitor 19 which are the plurality of high-voltage electrical components configuring the filter circuit 17 of the inverter device 7, and the opposing other side is supported from below by the multiple lead terminals 21A of the plurality of semiconductor switching elements 21 such as IGBTs configuring the switching circuit 20 of the inverter device 7.

In addition to the above, the center region of the main circuit board 23 is supported from below by the inter-circuit board connection terminal 31 electrically and mechanically connected between the main circuit board 23 and the sub-circuit board 26 arranged below the main circuit board 23, and the other side is fixed and supported by connecting the glass-sealed terminal 33 and the UVW busbar 32.

For this reason, vibration force applied to the main circuit board 23 due to running vibration of the vehicle or the like and stress such as pushing force applied to the main circuit board 23 when inserting the connector 13 into the P-N terminal 29 is dispersed and alleviated by providing multiple support points and fixing points as described above, and it is possible to improve the vibration resistance.

Thus, according to the present embodiment, the rectangular main circuit board 23 is housed with four corners thereof supported at boss parts 27 at locations above the plurality of semiconductor switching elements 21 such as IGBTs configuring the coil 18, the capacitor 19, and the switching circuit 20 which are the plurality of high-voltage electrical components configuring the filter circuit 17 as described above. The coil 18 and the capacitor 19 are arranged in parallel along one side of the main circuit board 23 on one side of the inverter housing part 8 and the one side of the main circuit board 23 is supported from below by the upper surfaces thereof. In addition, the plurality of semiconductor switching elements 21 is arranged in parallel along the other side opposing the one side of the main circuit board 23 on the other side of the inverter housing part 8, and the other side of the main circuit board 23 is supported from below by the multiple lead terminals 21A extending upward therefrom.

Due to this, it is possible for the main circuit board 23 housed in the inverter housing part 8 with four corners supported by the boss parts 27 to be installed by supporting two opposing sides other than the four corners from below using the plurality of high-voltage electrical components, that is, the coil 18 and the capacitor 19, and the plurality of semiconductor switching elements 21. Also, it is possible to firmly support the main circuit board 23 by setting the support points of the coil 18, the capacitor 19, and the semiconductor switching elements 21 as the fixing points and the support points of the main circuit board 23. For this reason, it is not necessary to secure the vibration resistance of the main circuit board 23 by filling the gel material or erecting supporting columns, and by making these unnecessary and securing the vibration resistance of the main circuit board 23 using existing inverter components, it is possible to simplify the configuration, reduce the size and weight, lower costs, and improve reliability.

In addition, the coil 18 and the capacitor 19 are installed on the concave section 9B of one side along the axial direction of the outer peripheral wall of the cylindrical housing 2 forming the bottom surface of the inverter housing part 8, and the filter circuit 17 is configured by mounting the coil 18 and the capacitor 19 on the main circuit board 23. In this manner, by installing comparatively large high-voltage electrical components such as the coil 18, and the capacitor 19 configuring the filter circuit 17, on the concave surface 9B of one side along the axial direction of the outer peripheral wall of the cylindrical housing 2 forming the bottom surface of the inverter housing part 8, the height dimensions of the inverter housing part 8 are suppressed to be low. Furthermore, by configuring the filter circuit 17 by mounting these high-voltage electrical components on the main circuit board 23, it is possible to configure the filter circuit 17 in a simple manner by omitting busbars and the like.

Due to this, by reducing the size of the inverter housing part 8 and simplifying and reducing the size of the inverter device 7 by eliminating components or the like, it is possible to reduce the size and weight and lower the costs of the inverter-integrated electric compressor 1.

Similarly, the plurality of semiconductor switching elements 21 is fixedly installed on the heat-radiating block 30 erected on the concave surface 9B of the other side along the axial direction of the outer peripheral wall of the cylindrical housing 2 forming the bottom surface of the inverter housing part 8, and the switching circuit 20 is configured by mounting the plurality of semiconductor switching elements 21 on the main circuit board 23. In this manner, by the plurality (six) of semiconductor switching elements 21 such as IGBTs being fixedly installed on the heat-radiating block 30 erected on the concave surface 9B of the one side along the axial direction of the outer peripheral wall of the cylindrical housing 2 forming the bottom surface of the inverter housing part 8, the heat dissipation performance is secured while the installation space of the semiconductor switching elements 21 is narrowed. Moreover, it is possible to secure the strength for supporting the main circuit board 23 by configuring the switching circuit 20 by shortening the lead terminals 21A as much as possible and mounting the terminals on the main circuit board 23.

For this reason, by reducing the size of the inverter housing part 7 and simplifying and reducing the size of the inverter device 7, it is possible to reduce the size and weight and lower the costs of the inverter-integrated electric compressor 1. Here, in a case of using IGBTs as the semiconductor switching elements 21, there are a total of 18 (3 at six places) of the lead terminals 21A and it is possible to secure sufficient rigidity since the main circuit board 23 is supported thereby.

In addition, the heat-radiating block 30 is a block formed of a heat conductive material such as an aluminum alloy erected in the vertical direction on the bottom surface of the inverter housing part 8. The plurality of semiconductor switching elements 21 is fixedly installed on the vertical side surfaces of the heat-radiating block 30 with the lead terminals 21A facing vertically upward. In this manner, by three-dimensionally installing the plurality (six) of semiconductor switching elements 21 such as IGBTs on both of the vertical side surfaces of the heat-radiating block 30 with the lead terminals 21A facing vertically upward, it is possible to narrow the installation space, and it is possible to dissipate the heat generated by these elements to the housing 2 side through the block made of heat conductive material and to favorably maintain the cooling performance.

Moreover, it is not necessary to bend the three lead terminals 21A extended from each of the semiconductor switching elements 21, the lead terminals 21A may extend straight upward, the rigidity is secured by minimizing the lengths thereof, and it is possible to support the main circuit board 23. Accordingly, by reducing the size of the inverter housing part 8 and simplifying and reducing the size of the inverter device 7, it is possible to reduce the size and weight and lower the costs of the inverter-integrated electric compressor 1.

Furthermore, in the present embodiment, the filter circuit 17 and the switching circuit 20 are configured on the main circuit board 23 by the coil 18, the capacitor 19, and the plurality of semiconductor switching elements 21 being mounted by each of the lead terminals 18A, 19A, and 21A passing through the through-holes 23A in the main circuit board 23 and being soldered in a pattern on the main circuit board 23. For this reason, the filter circuit 17 and the switching circuit 20 are configured on the main circuit board 23 by each of the lead terminals 18A, 19A, and 21A passing through the through-holes 23A in the main circuit board 23 and being soldered and the coil 18, the capacitor 19, and the plurality of semiconductor switching elements 21 being mounted. At the same time, it is possible to firmly support the main circuit board 23 with the coil 18, the capacitor 19, and the plurality of semiconductor switching elements 21. Accordingly, it is possible to sufficiently improve the vibration resistance of the main circuit board 23 while simplifying the configuration of the inverter device 7.

In addition, the main circuit board 23 is not only supported by the boss parts 27, the coil 18, the capacitor 19, and the plurality of semiconductor switching elements 21, but also by the inter-circuit board connection terminal 31 electrically and mechanically connected with the sub-circuit board 26, on which the low-voltage communication circuit 25 connected with the communication line 24 is mounted, and installed near the central section of the inverter housing part 8 which is a lower portion of the main circuit board 23, as well as by the UVW busbar 32 connected with the glass-sealed terminal 33 installed to pass through the housing 2 at the front portion of the inverter housing part 8 in the same manner.

Accordingly, it is possible to firmly support the main circuit board 23 using the constituent components of the inverter device 7 without providing a new support member. Also, it is possible to improve the vibration resistance, simplify the configuration, reduce the size and weight, and lower the costs of the inverter device 7 without providing a gel material or a dedicated support column or the like.

Note that the present invention is not limited to the invention according to the embodiment as described above, and changes can be made as appropriate without departing from the gist thereof. For example, in the embodiment described above, the P-N terminal 24 installed on the upper surface of the main circuit board 23 is configured to be installed at a position above the capacitor 19. However, the P-N terminal 24 may be configured to be installed at a position above on the coil 18. In addition, the heat-radiating block 30 for installing the plurality of semiconductor switching elements 21 has a rectangular shape; however, as long as the side surfaces on which the plurality of semiconductor switching elements 21 is fixedly installed are vertical surfaces, it is not always necessary for the heat-radiating block 30 to have a rectangular shape.

Furthermore, the main circuit board 23 may be supported and fixed at support points and fixing points other than the support points and fixing points described in the embodiment above. In addition, the DC power supply method to the inverter device 7 is not limited to that of the embodiment described above, and may be any method or configuration.

REFERENCE SIGNS LIST

1 Inverter-integrated electric compressor
2 Housing
3 Motor housing
7 Inverter device
8 Inverter housing part
9B Bottom surface of inverter housing part (concave surface)
17 Filter circuit
18 Coil (high-voltage electrical component)
18A Lead terminal
19 Capacitor (high-voltage electrical component)
19A Lead terminal

20 Switching circuit
21 Semiconductor switching element
21A Lead terminal
22 Inverter circuit and control circuit
23 Main circuit board
23A Through-hole
24 Communication line
25 Communication circuit
26 Sub-circuit board
27 Boss part
30 Heat-radiating block
31 Inter-circuit board connection terminal
32 UVW busbar
33 Glass-sealed terminal

The invention claimed is:

1. An inverter-integrated electric compressor for which an inverter device is integrally incorporated in an inverter housing part provided in a housing periphery, the integrally incorporated inverter device comprising a plurality of high-voltage electrical components configuring a filter circuit, a plurality of semiconductor switching elements configuring a switching circuit, and a rectangular main circuit board on which an inverter circuit including the filter circuit and the switching circuit is mounted, the main circuit board being housed while four corners thereof are supported by boss parts in locations above the plurality of high-voltage electrical components and the plurality of semiconductor switching elements, the plurality of high-voltage electrical components being arranged in parallel along one side of the main circuit board at one side of the inverter housing part, the upper surface thereof supporting one side of the main circuit board from below, and the plurality of semiconductor switching elements being arranged in parallel along another side opposing the one side of the main circuit board at another side of the inverter housing part, with another side of the main circuit board being supported from below by multiple lead terminals extending upward.

2. The inverter-integrated electric compressor according to claim 1, wherein the plurality of high-voltage electrical components is installed on a bottom surface of one side along an axial direction of an outer peripheral wall of a cylindrical housing forming a bottom surface of the inverter housing part, and the filter circuit is configured by mounting the plurality of high-voltage electrical components on the main circuit board.

3. The inverter-integrated electric compressor according to claim 1, wherein the plurality of semiconductor switching elements is fixedly installed on a heat-radiating block erected on the bottom surface of another side along the axial direction of the outer peripheral wall of the cylindrical housing forming the bottom surface of the inverter housing part, and the switching circuit is configured by mounting the plurality of semiconductor switching elements on the main circuit board.

4. The inverter-integrated electric compressor according to claim 3, wherein the heat-radiating block is a block formed of a heat conductive material erected in a vertical direction on the bottom surface of the inverter housing part, and the plurality of semiconductor switching elements is fixedly installed on both vertical side surfaces thereof with the lead terminals facing vertically upward.

5. The inverter-integrated electric compressor according to claim 1, wherein the plurality of high-voltage electrical components and the plurality of semiconductor switching elements configure the filter circuit and the switching circuit on the main circuit board by each lead terminal being passed through through-holes in the main circuit board and being soldered and mounted in a pattern on the main circuit board.

6. The inverter-integrated electric compressor according to claim 1, wherein, the main circuit board is supported not only by the boss parts, the plurality of high-voltage electrical components, and the plurality of semiconductor switching elements, but also by an inter-circuit board connection terminal installed near a center of the inverter housing part, which is a lower portion of the main circuit board, to connect electrically and mechanically with a sub-circuit board on which a low-voltage communication circuit connected with a communication line is mounted, and/or supported by a UVW busbar connected with a glass-sealed terminal installed to pass through the housing at a location in front of the inverter housing part.

* * * * *